US012592475B2

(12) United States Patent
Kim et al.

(10) Patent No.: US 12,592,475 B2
(45) Date of Patent: Mar. 31, 2026

(54) ANTENNA STRUCTURE AND DISPLAY DEVICE INCLUDING THE SAME

(71) Applicant: DONGWOO FINE-CHEM CO., LTD., Jeollabuk-do (KR)

(72) Inventors: Dae Kyu Kim, Gyeonggi-do (KR); In Kak Song, Jeollabuk-do (KR); Han Sub Ryu, Gyeongsangbuk-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 300 days.

(21) Appl. No.: 18/131,922

(22) Filed: Apr. 7, 2023

(65) Prior Publication Data

US 2023/0327322 A1 Oct. 12, 2023

(30) Foreign Application Priority Data

Apr. 8, 2022 (KR) ........................ 10-2022-0043922

(51) Int. Cl.
*H01Q 1/24* (2006.01)
*H01Q 1/38* (2006.01)

(52) U.S. Cl.
CPC ............... *H01Q 1/243* (2013.01); *H01Q 1/38* (2013.01)

(58) Field of Classification Search
CPC ................................. H01Q 1/243; H01Q 1/38
See application file for complete search history.

(56) References Cited

U.S. PATENT DOCUMENTS

2021/0242569 A1* 8/2021 Fujii ...................... H01Q 21/08
2024/0146349 A1* 5/2024 Jin ........................... H01Q 1/48

FOREIGN PATENT DOCUMENTS

KR 10-2013-0009541 A 1/2013
KR 10-2013-0095451 A 8/2013
KR 10-2327558 B1 11/2021

* cited by examiner

*Primary Examiner* — David E Lotter
(74) *Attorney, Agent, or Firm* — The PL Law Group, PLLC

(57) ABSTRACT

An antenna structure according to an embodiment includes an antenna device including an antenna unit, a circuit board electrically connected to the antenna unit, an insulating layer covering the antenna device and a portion of the circuit board, and an air layer formed between the antenna device and the insulating layer to partially cover the antenna unit.

17 Claims, 5 Drawing Sheets

ANTENNA STRUCTURE AND DISPLAY DEVICE INCLUDING THE SAME

CROSS-REFERENCE TO RELATED APPLICATION AND CLAIM OF PRIORITY

This application claims the benefit under 35 USC § 119 of Korean Patent Application No. 10-2022-0043922 filed on Apr. 8, 2022 in the Korean Intellectual Property Office, the entire disclosure of which is incorporated herein by reference for all purposes.

BACKGROUND

1. Field

The present invention relates to an antenna structure and a display device including the same. More particularly, the present invention relates to an antenna structure including an antenna device and a circuit board, and a display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

For example, an antenna for performing an ultra-high frequency band communication can be required in the display device. As the display device to which the antenna is applied becomes thinner and lighter, a space allocated for the antenna may also decrease. Accordingly, transmission and reception of high-frequency and broadband signals within a limited space may not be easily implemented in a limited space.

However, when the driving frequency of the antenna increases, signal loss may also be increased, and a degree of the signal loss may be further increased as a length of the transmission path increases.

Additionally, when an intermediate circuit structure such as a flexible printed circuit board (FPCB) is used to electrically connect a driving integrated circuit (IC) chip and the antenna for feeding/driving control of the antenna, an additional signal loss and signal disturbance may occur.

For example, when a power is supplied to the antenna from the driving integrated circuit chip, unintentional radiation may occur from a wiring through which the power is distributed. Accordingly, noises may be generated, and radiation efficiency of the antenna may be degraded.

Thus, a construction of an antenna that is substantially free from an influence of an intermediate circuit structure and stably implements radiation in the desired high frequency band is advantageously required. For example, Korean Published Patent Application No. 2013-0095451 discloses an antenna integrated into a display panel.

SUMMARY

According to an aspect of the present invention, there is provided an antenna structure having improved operational reliability and radiational property.

According to an aspect of the present invention, there is provided a display device including an antenna structure with improved operational reliability and radiational property.

(1) An antenna structure, including: an antenna device including an antenna unit; a circuit board electrically connected to the antenna unit; an insulating layer covering the antenna device and a portion of the circuit board; and an air layer formed between the antenna device and the insulating layer to partially cover the antenna unit.

(2) The antenna structure of the above (1), wherein the antenna unit includes a radiator and a transmission line connected to the radiator.

(3) The antenna structure of the above (2), wherein the air layer covers at least a portion of the transmission line.

(4) The antenna structure of the above (3), wherein the air layer entirely covers the transmission line and partially covers the radiator.

(5) The antenna structure of the above (3), wherein the air layer does not cover the radiator.

(6) The antenna structure of the above (3), wherein the transmission line includes a first transmission line and a second transmission line facing each other, and the air layer commonly covers the first transmission line and the second transmission line.

(7) The antenna structure of the above (2), wherein the air layer is formed along a portion of a boundary of the antenna unit in a plan view.

(8) The antenna structure of the above (2), wherein the antenna unit further includes a signal pad connected to the transmission line and bonded to the circuit board.

(9) The antenna structure of the above (8), wherein the antenna device has a bonding area overlapping the circuit board in a plan view and a non-bonding area not overlapping the circuit board in the plan view, and the air layer is not formed on the bonding area and partially covers the non-bonding area.

(10) The antenna structure of the above (9), wherein the air layer partially covers a sidewall of the circuit board.

(11) The antenna structure of the above (1), wherein the antenna device includes a plurality of the antenna units, and the air layer includes a plurality of air caps covering each of the plurality of antenna units.

(12) The antenna structure of the above (1), wherein a thickness of the air layer is smaller than a thickness of the circuit board.

(13) The antenna structure of the above (1), wherein a thickness of the air layer decreases as a distance from the circuit board increases.

(14) The antenna structure of the above (1), wherein a ratio of a thickness of the circuit board relative to a thickness of the insulating layer is in a range from 0.3 to 2.5.

(15) The antenna structure of the above (1), wherein the circuit board includes a core layer, and a circuit wiring disposed on one surface of the core layer and connected to the antenna device.

(16) The antenna structure of the above (15), further including a conductive intermediate structure bonding the antenna device and the circuit wiring with each other

(17) The antenna structure of the above (1), wherein the insulating layer includes an optically clear adhesive (OCA) or an optically clear resin (OCR).

(18) A display device including the antenna structure according to the above-described embodiments.

(19) The display device of the above (18), wherein the display device has a display area and a peripheral area, and the air layer is disposed in the peripheral area.

An antenna structure according to exemplary embodiments may include an air layer formed between an antenna device and an insulating layer to partially cover the antenna device. Accordingly, an air region having a low permittivity may be formed above the antenna device, and antenna signal/radiation efficiency may be increased. Additionally, signal/feeding loss of the antenna device may be suppressed, and improved antenna gain properties may be implemented even in a high frequency band of 3G or higher.

The antenna device may include an antenna unit including a radiator and a transmission line connected to the radiator. The air layer may entirely cover the transmission line and partially cover the radiator. Accordingly, feeding/signal loss transmitted to the radiator through the transmission line may be reduced, and radiation reliability and efficiency of the radiator may be improved.

The air layer may cover the transmission line of the antenna device and may not cover the radiator. Accordingly, lifting and peeling of the insulating layer that may occur due to the air layer may be prevented while suppressing signal loss in the transmission line. Thus, bonding stability between a circuit board and the antenna device may be improved, and visual recognition of the air layer may be prevented, thereby improving a design/arrangement freedom.

DETAILED DESCRIPTION OF THE EMBODIMENTS

According to exemplary embodiments of the present invention, an antenna structure including an antenna device, a circuit board, an insulating layer partially covering the antenna device and the circuit board, and an air layer formed between the antenna device and the insulating layer is provided.

According to exemplary embodiments of the present invention, a display device including the antenna structure is also provided. An application of the antenna structure is not limited to the display device, and the antenna structure may be applied to various objects or structures such as a vehicle, a home electronic appliance, an architecture, etc.

The antenna structure may include, e.g., a microstrip patch antenna fabricated in the form of a transparent film, a monopole antenna or a dipole antenna. The antenna structure may be applied to communication devices for a mobile communication of a high or ultrahigh frequency band corresponding to a mobile communication of, e.g., 3G, 4G, 5G or higher.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first", "second", "upper", "lower", "top", "bottom", "front", "rear", etc., used herein do not designate an absolute position, but are relatively used to distinguish different elements or different positions.

Figure 1:
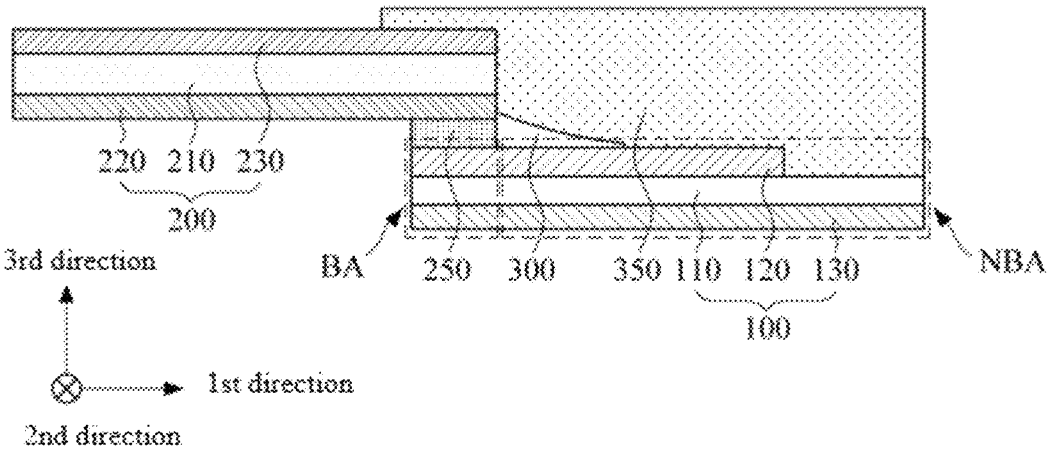
FIGS. 1 and 2 are schematic cross-sectional views illustrating an antenna structure in accordance with exemplary embodiments.
Figure 2:
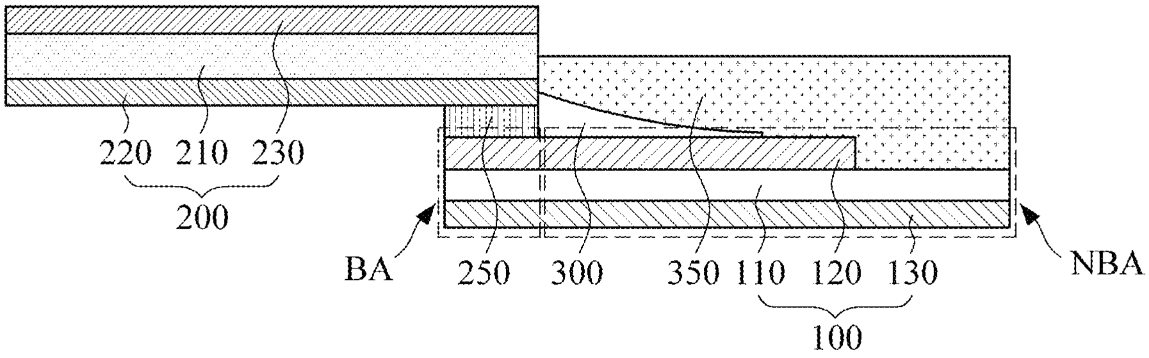

FIGS. 1 and 2 are schematic cross-sectional views illustrating an antenna structure in accordance with exemplary embodiments.

Referring to FIG. 1, the antenna structure includes an antenna device 100, a circuit board 200 connected to the antenna device 100, an insulating layer 350 covering the antenna device 100 and a portion of the circuit board 200, and an air layer 300 formed between the antenna device 100 and the insulating layer 350 to partially cover the antenna device 100.

The antenna device 100 may include an antenna dielectric layer 110 and an antenna unit 120 disposed on the antenna dielectric layer 110. In an embodiment, an antenna ground layer 130 may be disposed on a bottom surface of the antenna dielectric layer 110.

The antenna dielectric layer 100 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more therefrom.

In some embodiments, an adhesive film such as an optically clear adhesive (OCA) or an optically clear resin (OCR) may be included in the antenna dielectric layer 110. In some embodiments, the antenna dielectric layer 110 may include an inorganic insulating material such as silicon oxide, silicon nitride, silicon oxynitride, glass, etc.

In an embodiment, the antenna dielectric layer 110 may be provided as a substantially single layer.

In an embodiment, the antenna dielectric layer 110 may include a multi-layered structure of at least two or more layers. For example, the antenna dielectric layer 110 may include a base layer and a dielectric layer, and may include an adhesive layer between the base layer and the dielectric layer.

An impedance or inductance may be generated between the antenna unit 120 and the antenna ground layer 130 by the antenna dielectric layer 110, so that a frequency band at which the antenna structure is driven or operated may be adjusted. In some embodiments, a dielectric constant of the antenna dielectric layer 110 may be adjusted in a range from about 1.5 to about 12. When the dielectric constant exceeds about 12, driving in a high frequency band may not be implemented due to an excessively reduced driving frequency.

The antenna unit 120 may include a radiator. For example, the antenna unit 120 may include the radiator and a transmission line connected to the radiator. The antenna unit 120 or the radiator may be designed to have a resonance frequency of a higher high frequency or ultra-high frequency band, corresponding to, e.g., 3G, 4G, 5G or higher communication. For example, the resonance frequency of the radiator may be in a range from about 20 to 70 GHz.

The antenna ground layer 130 may be disposed on the bottom surface of the dielectric layer. In some embodiments, the antenna ground layer 130 may be disposed to entirely cover the antenna unit 120 in a planar view (e.g., in a third direction).

In an embodiment, a conductive member of an image display device or display panel to which the antenna structure is applied may serve as the antenna ground layer 130.

For example, the conductive member may include electrodes or wires such as a gate electrode, a source/drain electrode, a pixel electrode, a common electrode, a data line, a scan line, etc., included in a thin film transistor (TFT) array panel.

In an embodiment, a metallic member such as an SUS plate, a sensor member such as a digitizer, and a heat dissipation sheet disposed at a rear portion of the image display device may serve as the antenna ground layer 130.

The antenna unit 120 and the antenna ground layer 130 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in a combination thereof.

In an embodiment, the antenna unit 120 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 120 and the antenna ground layer 130 may include a transparent conductive oxide such as indium tin oxide (ITO), indium zinc oxide (IZO), zinc oxide (ZnOx), indium zinc tin oxide (IZTO), etc.

In some embodiments, the antenna unit 120 may include a stacked structure of a transparent conductive oxide layer and a metal layer. For example, the antenna unit may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The antenna unit 120 may include a blackened portion, so that a reflectance at a surface of the antenna unit 120 may be decreased to suppress a visual recognition of the antenna unit due to a light reflectance.

In an embodiment, a surface of the metal layer included in the antenna unit 120 may be converted into a metal oxide or a metal sulfide to form a blackened layer. In an embodiment, a blackened layer such as a black material coating layer or a plating layer may be formed on the antenna unit 120 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

The circuit board 200 may be disposed on the antenna device 100 and electrically connected to the antenna unit 120. In exemplary embodiments, the circuit board 200 may be a flexible printed circuit board (FPCB).

The circuit board 200 may include a core layer 210, a circuit wiring 220 disposed on one surface of the core layer 210, and a ground plate 230 disposed on the other surface of the core layer 210.

In an embodiment, an upper cover-lay film and a lower cover-lay film may be formed on one surface and the other surface of the core layer 210, respectively, to protect wirings and electrode layers.

The core layer 210 may include, e.g., a flexible resin such as a polyimide resin, a modified polyimide (MPI), an epoxy resin, polyester, a cyclo olefin polymer (COP), a liquid crystal polymer (LCP), etc. The core layer 210 may include an internal insulating layer included in the circuit board 200.

The circuit wiring 220 may serve as an antenna feeding wiring. For example, one end portion of the circuit wiring 220 may be exposed by partially removing the cover-lay film of the circuit board 200. The one end portion of the exposed circuit wiring 220 may be bonded to the antenna unit 120.

The insulating layer 350 may cover the antenna device 100 and a portion of the circuit board 200. For example, the insulating layer 350 may physically fix the antenna device 100 and the circuit board 200. Accordingly, an electrical contact and a bonding stability between the antenna unit 120 and the circuit wiring 220 may be improved by the insulating layer 350.

In an embodiment, the insulating layer 350 may include an adhesive material such as optically transparent adhesive (OCA) or optically transparent resin (OCR). For example, the insulating layer 350 may include the adhesive layer containing the OCA or the OCR.

Functional layers of the display device such as an optical layer, a hard coating layer, a protective layer, a window film, a window glass, etc., may be bonded or laminated to the antenna structure by the insulating layer 350 including the adhesive layer.

In some embodiments, a thickness of the insulating layer 350 may be greater than that of the circuit board 200. For example, the insulating layer 350 may cover portions of top and side surfaces of the circuit board 200.

In some embodiments, the thickness of the insulating layer 350 may be smaller than the thickness of the circuit board 200. For example, the insulating layer 350 may cover a portion of a lateral side surface of the circuit board 200.

The thickness of the insulating layer 350 may be defined as a distance from the antenna unit 120 to a top surface of the insulating layer 350. The thickness of the circuit board 200 may be defined as a distance from the antenna unit 120 to the top surface of the circuit board 200. If the antenna structure includes a conductive intermediate structure 250, the thickness of the circuit board 200 may be defined as a distance including a thickness of the conductive intermediate structure 250.

In some embodiments, a ratio of the thickness of the circuit board 200 to the thickness of the insulating layer 350 may be in a range from 0.3 to 2.5, preferably from 0.3 to 0.5.

An air layer 300 may be formed between the antenna device 100 and the insulating layer 350 to partially cover the antenna device 100. For example, the air layer 300 may be sandwiched or buried between the antenna device 100, the insulating layer 350 and the circuit board 200. For example, the air layer 300 may be a void formed between the antenna device 100 and the insulating layer 350.

The antenna unit 120 may be spaced apart from the insulating layer 350 by the air layer 300, so that degradation of a radiation gain due to the insulating layer 350 may be suppressed or reduced. Additionally, as an air having a low permittivity is positioned on the antenna unit 120, a line loss may be reduced, the gain of the antenna device 100 may be improved, and high-efficiency radiation propertied may be implemented.

In an embodiment, a dielectric constant of the air layer 300 may be in a range from 1 to 1.5, preferably from 1 to 1.2. For example, the air layer 300 may substantially consist of air without including other materials. In this case, the air layer 300 may have a dielectric constant of 1.

In an embodiment, an area where the antenna device 100 overlaps the circuit board 200 in a thickness direction may be provided as a bonding area BA. For example, the bonding area BA of the antenna device 100 may be an area where the antenna device 100 is bonded to the circuit board 200.

A non-bonding area NBA may be defined as an area except for the bonding area BA of the antenna device 100. For example, the non-bonding area NBA of the antenna device 100 may be an area in which the antenna device 100 does not overlap the circuit wiring 220 of the circuit board 200 in the thickness direction.

The air layer 300 may not be formed on the bonding area BA of the antenna device 100. For example, the air layer 300 may not cover the bonding area BA of the antenna device 100 and may only partially cover the non-bonding area NBA.

The antenna unit 120 and the circuit wiring 220 may be sequentially connected or stacked in the bonding area BA of the antenna device 100 to form a bonding structure. In an embodiment, the signal pad 126, the conductive intermediate structure 250 and the circuit wiring 220 may be sequentially connected or stacked to form the bonding structure.

The air layer 300 may not be formed in the bonding area BA, so that the bonding stability between the antenna device 100 and the circuit board 200 may be improved. Thus, the bonding structure may be prevented from being detached due to the formation of the air layer 300.

In an embodiment, the air layer 300 may partially cover a sidewall of the circuit board 200. If the air layer 300 is sandwiched or buried between the antenna device 120 and the insulating layer 350 without contacting the circuit board 200, a permittivity of an upper region of the antenna unit 120 may nonuniform between the circuit board 200 and the antenna unit 120.

The air layer 200 may partially cover the sidewall of the circuit board 200, and may contact the circuit board 200, so that permittivity of the upper region of the antenna unit 120 becomes uniform, and signal disturbance and loss may be suppressed.

In exemplary embodiments, a thickness of the air layer 300 may be smaller than a thickness of the circuit board 200. For example, the air layer 300 may be positioned at a level lower than the top surface of the circuit board 200. Accordingly, adhesion between the antenna device 100 and the circuit board 200 or between the antenna device 100 and the conductive intermediate structure 250 may be increased, and the bonding stability may be further improved.

In an embodiment, an electrical connection between the antenna device 100 and the circuit board 200 may be implemented by a direct contact. For example, the transmission line 124 and/or the signal pad 126 of the antenna device 100 may directly contact the circuit wiring 220 of the circuit board 200.

In an embodiment, the electrical connection between the antenna device 100 and the circuit board 200 may be implemented by a conductive intermediate structure 250.

Referring to FIG. 2, the antenna structure may further include the conductive intermediate structure 250 disposed between the antenna device 100 and the circuit board 200. For example, the antenna unit 120 and the circuit wiring 220 may be bonded/coupled to each other through the conductive intermediate structure 250. In the bonding area BA, the antenna unit 120, the conductive intermediate structure 250, and the circuit wiring 220 may be in a sequential contact or stack.

For example, the conductive intermediate structure 250 may be disposed on the bonding area of the antenna device 100 to electrically connect the antenna device 100 and the circuit board 200. For example, the transmission line 124 and/or the signal pad 126 of the antenna device 100 may be electrically connected to the circuit wiring 220 of the circuit board 200 through the conductive intermediate structure 250.

In an embodiment, the conductive intermediate structure 250 may include an anisotropic conductive film (ACF).

Figure 3:
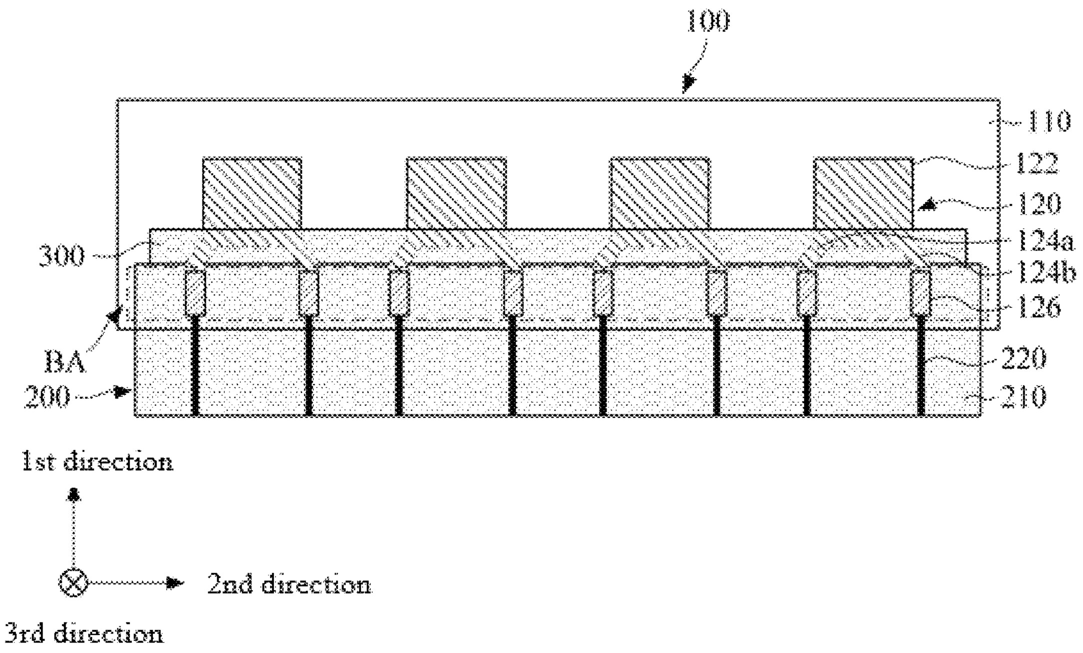
FIGS. 3 and 4 are plan views illustrating an antenna structure in accordance with exemplary embodiments.
Figure 4:
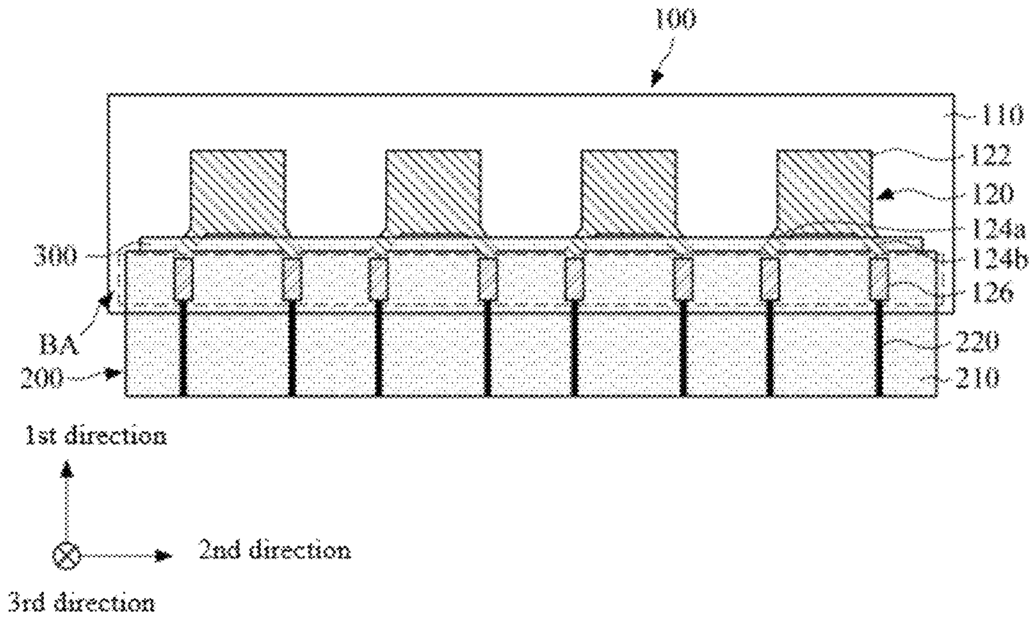

FIGS. 3 and 4 are plan views illustrating an antenna structure in accordance with exemplary embodiments.

Referring to FIG. 3, the antenna unit 120 may include a radiator 122 and a transmission line 124 connected to the radiator 122. The radiator 122 may have, e.g., a polygonal plate shape. The transmission line 124 may extend from one side of the radiator 122.

In an embodiment, the transmission line 124 may be formed as a single member substantially integral with the radiator 122.

In exemplary embodiments, a plurality of the transmission lines 124 may be connected to one radiator 122. The plurality of the transmission lines 124 may be connected to one radiator 122, so that a plurality of polarization directions may be substantially provided.

In some embodiments, a first transmission line **124*a* and a second transmission line 124*b* may be connected to one radiator 122. For example, each of the first transmission line 124*a* and the second transmission line 124*b* may be connected to two vertices of a lower side of the radiator 122**.

The first transmission line **124*a* and the second transmission line 124*b* may be arranged symmetrically with each other. For example, the first transmission line 124*a* and the second transmission line 124*b* may be symmetrical with respect to a central line extending through a center of the radiator 122**.

The first transmission line **124*a* and the second transmission line 124*b* may extend in different directions. For example, the first transmission line 124*a* and the second transmission line 124*b* may extend in different directions to be directly connected to or in contact with the radiator 122**.

In an embodiment, an angle formed by extension directions of the first transmission line **124*a* and the second transmission line 124*b* may be substantially 90°. For example, extension directions of the first transmission line 124*a* and the second transmission line 124*b* may be orthogonal to each other. Preferably, the first transmission line 124*a* and the second transmission line 124*b*** may extend toward the center of the radiator.

In this case, a feeding may be performed in two substantially orthogonal directions to the radiator 122 through each of the transmission lines 124. Accordingly, dual polarization properties may be implemented from one radiator 122. For example, both vertical radiation and horizontal radiation properties may be implemented together from the radiator 122.

In an embodiment, the first transmission line 124*a* and the second transmission line 124*b* may each be connected to the radiator 122, and the air layer 300 may commonly cover the first transmission line 124*a* and the second transmission line 124*b*.

In some embodiments, the antenna unit 120 may further include a signal pad 126 connected to the transmission line 124. The radiator 122 and the signal pad 126 may be electrically connected to each other by the transmission line 124.

In an embodiment, the signal pad 126 may be formed as a member substantially integral with the transmission line 124. For example, a terminal end portion of the transmission line 124 may serve as the signal pad 126.

The circuit wiring 220 of the circuit board 200 may be electrically connected to the signal pad 126 of the antenna device 100. For example, the circuit wiring 220 may be bonded to the signal pad 126, and feeding/driving control of the radiator 122 may be performed through the signal pad 126.

In some embodiments, the antenna device 100 may include a plurality of the radiators 122. For example, a plurality of the radiators 122 may be arranged to form an array.

In this case, each of the circuit wirings 220 of the circuit board 200 may be individually and independently connected to the radiators 122. Accordingly, the feeding/driving control may be independently performed for each of the plurality of radiators 122. For example, different phase signals may be applied to each of the plurality of the radiators 122 through the circuit wiring 220 connected to each of the plurality of the radiators 122.

In exemplary embodiments, the air layer 300 may cover at least a portion of the transmission line 124. For example, the air layer 300 may cover at least a portion of the transmission line 124 in a plan view.

In some embodiments, the air layer 300 may entirely cover the transmission line 124 and may partially cover the radiator 122. Accordingly, a feeding/signal loss transmitted to the radiator 122 through the transmission line 124 may be reduced, and radiation reliability and efficiency of the radiator 122 may be improved.

In some embodiments, the air layer 300 may cover the transmission line 124 and may not cover the radiator 122. For example, the air layer 300 may partially cover the transmission line 124. For example, the air layer 300 may entirely cover the transmission line 124 and may not cover the radiator 122.

Accordingly, lift-off and detachment of the insulating layer 350 that may occur due to a gap between structures may be prevented while suppressing a signal loss in the transmission line 124. Thus, the bonding stability between the circuit board 200 and the antenna device 100 may be improved, and the visual recognition of the air layer 300 on the radiator 122 may be prevented, thereby improving a degree of freedom in an antenna construction.

In some embodiments, a length of the air layer 300 may be in a range from 10 μm to 700 μm, preferably from 10 μm to 200 μm. For example, the length of the air layer 300 refers to a length in a straight line direction (e.g., a first direction) from the bonding area BA toward the radiator 122.

Figure 5:
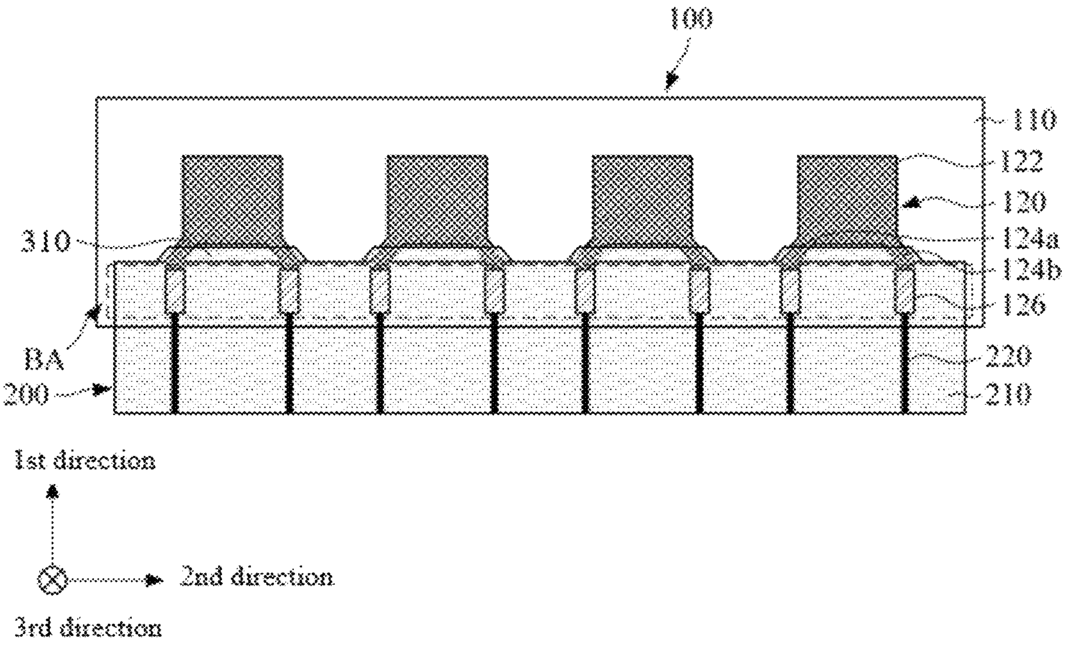
FIGS. 5 and 6 are plan views illustrating an antenna structure in accordance with exemplary embodiments.
Figure 6:
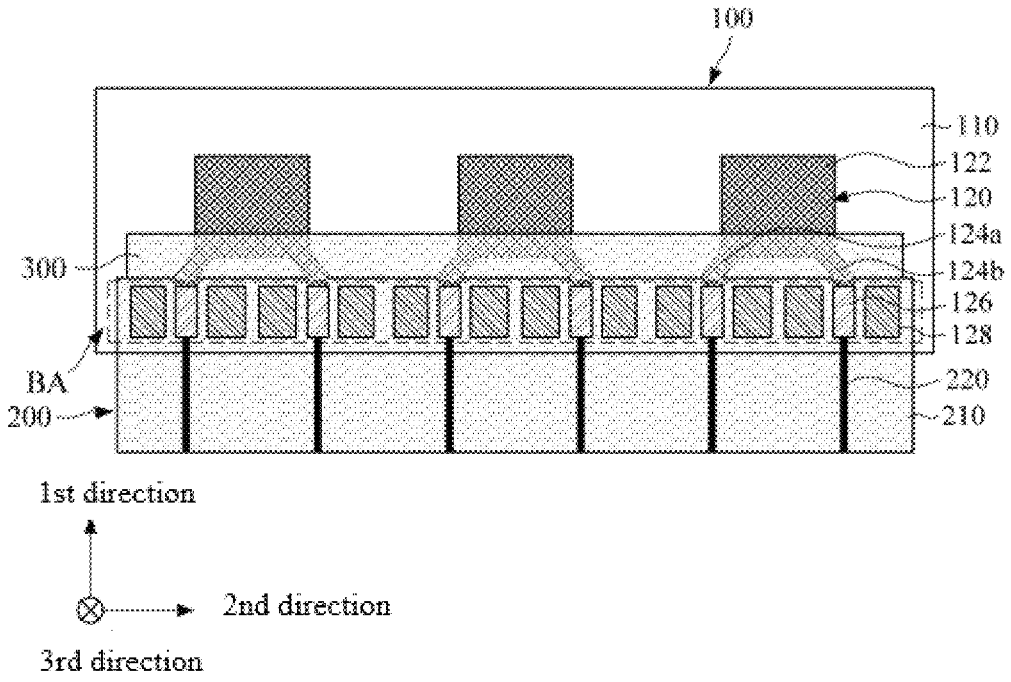

The term "length" used herein in this application refers to a distance in a horizontal direction (the first direction) in FIGS. 1 and 2, or a distance in a vertical direction (the first direction) in FIGS. 4 to 6.

Within the above range, a dielectric constant at the top surface of the antenna device 100 may be reduced, so that the signal loss of the antenna device 100 may be reduced, and high-efficiency radiation properties may be implemented. Additionally, a void area in the antenna structure may be reduced so that the degree of freedom of arrangement/construction of the antenna structure in the display device may be increased.

In exemplary embodiments, a thickness of the air layer 300 may become smaller as a distance from the circuit board 200 increases. For example, the thickness of the air layer 300 may be gradually decreased in a direction from the bonding area BA of the antenna device 100 toward the radiator 122 (e.g., in the first direction).

In this case, the air layer 300 having a low permittivity is relatively thick on a region where the transmission line 124 is formed, so that signal and feeding losses may be suppressed. Additionally, as the thickness of the air layer 300 is relatively thin on a region relatively far from the circuit board 200, so that lift-off of the insulating layer 350 may be prevented and the visual recognition of the air layer 300 may be improved.

FIGS. 5 and 6 are plan views illustrating an antenna structure in accordance with exemplary embodiments.

Referring to FIG. 5, the air layer 300 may be formed along a portion of a boundary of the antenna unit 120 in the plan view. For example, the air layer 300 may be formed along a portion of the boundaries of the radiator 122 and the transmission line 124 and may partially cover the radiator 122 and the transmission line 124.

Thus, an air having a low permittivity may be disposed on the radiator 122 and the transmission line 124 to increase signal and feeding efficiency. Further, the lift-off and detachment of the insulating layer 350 due to the air layer 300 may be prevented. Therefore, the radiation properties and bonding stability of the antenna structure may be improved while suppressing the visual recognition of the air layer 300.

In some embodiments, the air layer 300 may include a plurality of air caps 310. For example, the antenna device 100 may include a plurality of the antenna units 120, and the air cap 310 may partially and individually cover each of the antenna units 120. In this case, the plurality of the air caps 310 may be physically spaced apart from each other.

In an embodiment, the air cap 310 may be formed on the radiator 122 and the transmission line 124 along the peripheries of the radiator 122 and the transmission line 124, and the radiator 122 and/or the transmission line 124 may be selectively and partially covered by the air cap 310.

In some embodiments, the antenna unit 120 may include a mesh structure to improve transmittance. For example, the radiator 122 and the transmission line 124 may include the mesh structure. In an embodiment, at least a portion of the transmission line 124 may include a solid structure for enhancing a feeding efficiency.

In some embodiments, a dummy mesh pattern (not illustrated) may be formed around the radiator 122 and the transmission line 124.

Referring to FIG. 6, a ground pad 128 may be disposed around the signal pad 126 of the antenna device 100.

In an embodiment, a pair of the ground pads 128 may face each other with the signal pad 126 interposed therebetween.

The ground pad 128 may be electrically and physically separated from the transmission line 124 and the signal pad 126.

The ground pads 128 may be arranged around the signal pad 126, an adhesion to the conductive intermediate structure 250 may be increased and the bonding stability may be improved.

The signal pad 126 and the ground pad 128 may include a solid structure to reduce a feeding resistance, and improve noise absorption efficiency and horizontal radiation properties.

In exemplary embodiments, the antenna structure may further include an antenna driving integrated circuit (IC) chip. For example, one end portion of the circuit board 200 may be bonded to the antenna device 100 and the other end portion of the circuit board 200 may be electrically connected to the antenna driving IC chip.

The feeding/signal transmission to the antenna device 100 through the circuit wiring 220 may be controlled by the antenna driving IC chip.

For example, an intermediate circuit board may be disposed between the other end portion of the circuit board 200 and the antenna driving IC chip to electrically connect the circuit board 200 and the antenna driving IC chip with each other. The intermediate circuit board may be, e.g., a rigid printed circuit board. For example, the intermediate circuit board may include an intermediate circuit pattern formed in a prepreg substrate.

Figure 7:
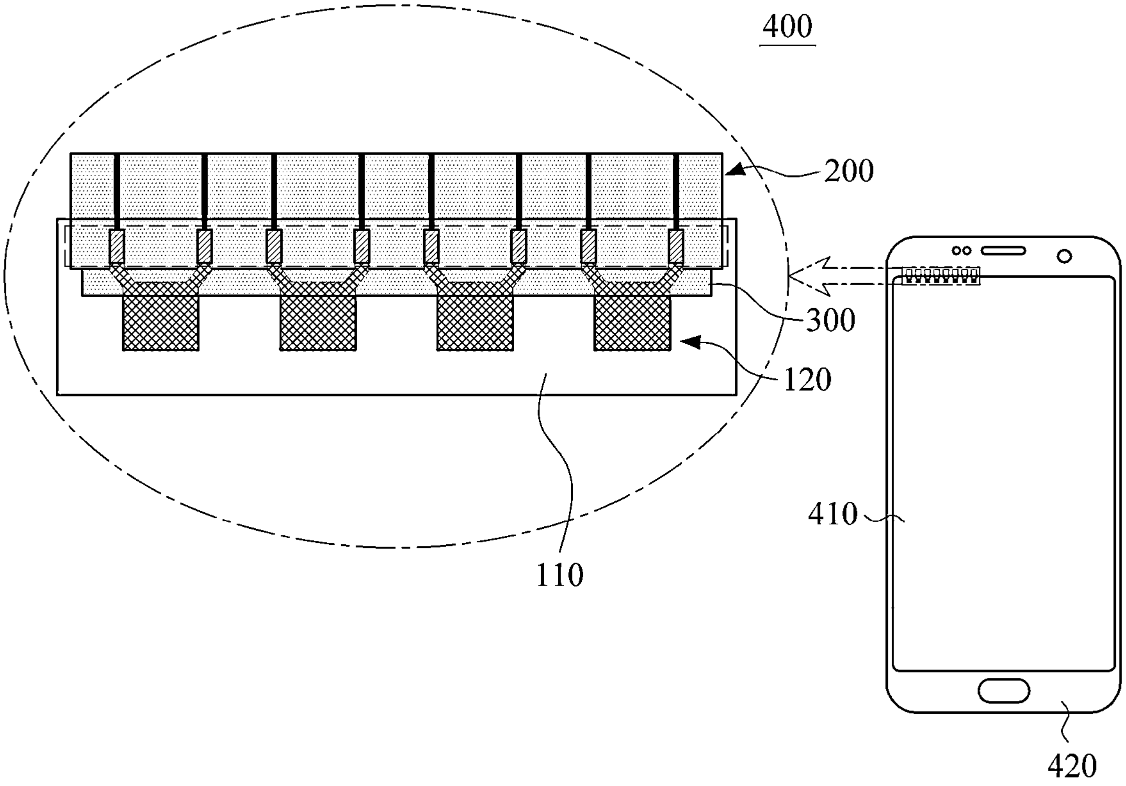
FIG. 7 is a schematic plan view illustrating a display device in accordance with exemplary embodiments.

FIG. 7 is a schematic plan view illustrating a display device in accordance with exemplary embodiments.

Referring to FIG. 7, a display device 400 may be implemented in the form of, e.g., a smart phone, and FIG. 7 illustrates a front portion or window surface of the display device 400. The front portion of the display device 400 may include a display area 410 and a peripheral area 420. The peripheral area 420 may correspond to, e.g., a light-shielding portion or a bezel portion of an image display device.

The antenna device 100 included in the above-described antenna structure may be disposed at the front portion of the display device 400, and may be disposed on, e.g., a display panel. In an embodiment, the radiator 122 of the antenna unit may at least partially disposed in the display area 410.

In this case, the radiator 122 may include a mesh structure, and a reduction of transmittance due to the radiator 122 may be prevented and the visual recognition of the antenna unit may be suppressed.

In some embodiments, a portion of the non-bonded area NBA of the antenna device 100 may be disposed in the display area 410. In this case, the air layer 300 may be disposed in the peripheral area 420 of the display device 400. Thus, the air layer 300 may be prevented from being visually recognized.

The bonding area BA of the antenna device 100 may be disposed in the peripheral area to prevent deterioration of an image quality from the display area 410.

In some embodiments, the antenna structure may be bent using the circuit board 200. Thus, for example, the intermediate circuit board and the antenna driving IC chip may be disposed at a rear portion of the display device 400.

As described above, the air layer 300 having a low permittivity and partially covering the antenna device 100 may be formed on the antenna device 100, a high efficiency antenna radiation capable of suppressing the signal loss while increasing signal and power supply reliability may be implemented.

Experimental Example: Measurement of Antenna Gain According to Length of Air Layer Antenna properties of antenna structures of Examples manufactured according to the structure shown in FIGS. 1, 3 and 4 and an antenna structure manufactured according to Comparative Example in which the air layer 300 was not formed were evaluated.

Specifically, the antenna structure of Comparative Example was formed to have the same structure and size as those of the antenna structures of Examples, except that the air layer 300 was not formed between the antenna device 100 and the insulating layer 350.

In Examples and Comparative Examples, the radiator 122 and the transmission line 124 were formed in a mesh structure using a Cu—Ca alloy, and the antenna ground pad 128 and the signal pad 126 were each formed as a solid pattern structure containing the Cu—Ca alloy.

A size of the radiator 122 was 2.7 mm×2.7 mm, and a size of the ground pad 125 was 2.765 mm×0.7 mm. A length of the transmission line 124 in the first direction was 0.2 mm.

The circuit wiring 220 and the ground plate 230 included in the circuit board 200 were each formed of a copper layer, and an LCP was used as the core layer 210.

In Example 1, the length of the air layer 300 in the first direction was 200 μm, and the air layer 300 was formed to entirely cover the transmission line 124. In Example 2, the length of the air layer 300 in the first direction was 100 μm, and the air layer 300 was formed to partially cover the transmission line 124. In Example 3, the length of the air layer 300 in the first direction was 700 μm, and the transmission line 124 was entirely covered and the radiator 122 was partially covered by the air layer 300.

While supplying a power to the circuit board of the antenna structures of Examples and Comparative Example, a maximum antenna gain (Max. gain) through the radiator was measured according to frequencies using VSWR (Voltage standing wave ratio) measurement results. For example, the VSWR may represent an impedance matching degree.

Figure 8:
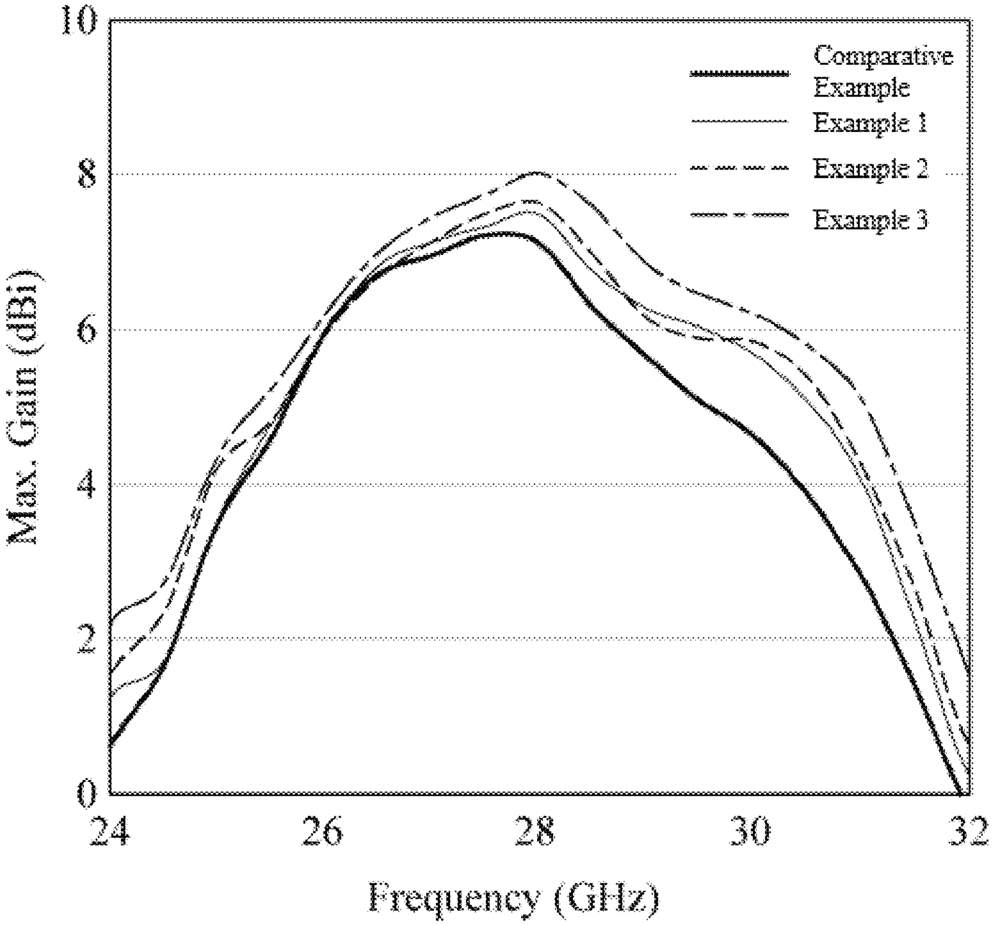
FIG. 8 is a graph showing antenna gains of antenna structure according to Example and Comparative Example.

FIG. 8 is a graph showing antenna gains of antenna structure according to Example and Comparative Example.

Referring to FIG. 8, in Examples where the air layer 300 was formed to partially cover the antenna device 100, the antenna gain values were increased throughout low frequency to high frequency bands.

What is claimed is:

1. An antenna structure, comprising:

an antenna device comprising an antenna unit;

a circuit board electrically connected to the antenna unit comprising a radiator, a transmission line connected to the radiator, and a signal pad connected to the transmission line and bonded to the circuit board;

an insulating layer covering the antenna device and a portion of the circuit board; and an air layer formed between the antenna device and the insulating layer to partially cover the antenna unit, wherein the antenna device has a bonding area overlapping the circuit board in a plan view and a non-bonding area not overlapping the circuit board in the plan view, and the air layer is not formed on the bonding area and partially covers the non-bonding area.

2. The antenna structure of claim 1, wherein the air layer covers at least a portion of the transmission line.

3. The antenna structure of claim 2, wherein the air layer entirely covers the transmission line and partially covers the radiator.

4. The antenna structure of claim 2, wherein the air layer does not cover the radiator.

5. The antenna structure of claim 2, wherein the transmission line comprises a first transmission line and a second transmission line facing each other, and the air layer commonly covers the first transmission line and the second transmission line.

6. The antenna structure of claim 1 wherein the air layer is formed along a portion of a boundary of the antenna unit in a plan view.

7. The antenna structure of claim 1, wherein the air layer partially covers a sidewall of the circuit board.

8. The antenna structure of claim 1, wherein the antenna device comprises a plurality of the antenna units, and the air layer comprises a plurality of air caps covering each of the plurality of antenna units.

9. The antenna structure of claim 1, wherein a thickness of the air layer is smaller than a thickness of the circuit board.

10. The antenna structure of claim 1, wherein a thickness of the air layer decreases as a distance from the circuit board increases.

11. The antenna structure of claim 1, wherein a ratio of a thickness of the circuit board relative to a thickness of the insulating layer is in a range from 0.3 to 2.5.

12. The antenna structure of claim 1, wherein the circuit board comprises a core layer, and a circuit wiring disposed on one surface of the core layer and connected to the antenna device.

13. The antenna structure of claim 12, further comprising a conductive intermediate structure bonding the antenna device and the circuit wiring with each other.

14. The antenna structure of claim 1, wherein the insulating layer includes an optically clear adhesive (OCA) or an optically clear resin (OCR).

15. A display device comprising the antenna structure according to claim 1.

16. The display device of claim 15, wherein the display device has a display area and a peripheral area, and the air layer is disposed in the peripheral area.

17. An antenna structure, comprising:

an antenna device comprising an antenna dielectric layer, and an antenna unit disposed on the antenna dielectric layer;

a circuit board electrically connected to the antenna unit;

a conductive intermediate structure disposed between the antenna unit and the circuit board;

an insulating layer covering the antenna device and a portion of the circuit board; and an air layer formed between the antenna device and the insulating layer to partially cover the antenna unit, wherein the circuit board is electrically connected to the antenna unit via the conductive intermediate structure.

* * * * *